US012039493B2

(12) United States Patent
Broder (10) Patent No.: US 12,039,493 B2
(45) Date of Patent: Jul. 16, 2024

(54) SYSTEM AND METHOD FOR SOCIAL FILTERING OF COMMENTS

(71) Applicant: YAHOO ASSETS LLC, Dulles, VA (US)

(72) Inventor: Andrei Broder, Menlo Park, CA (US)

(73) Assignee: YAHOO ASSETS LLC, New York, NY (US)

( * ) Notice: Subject to any disclaimer, the term of this patent is extended or adjusted under 35 U.S.C. 154(b) by 252 days.

(21) Appl. No.: 16/681,880

(22) Filed: Nov. 13, 2019

(65) Prior Publication Data

US 2020/0082343 A1    Mar. 12, 2020

Related U.S. Application Data

(63) Continuation of application No. 12/976,628, filed on Dec. 22, 2010, now Pat. No. 10,489,744.

(51) Int. Cl.
*G06F 16/9535* (2019.01)
*G06F 16/951* (2019.01)
*G06Q 10/10* (2023.01)
*G06Q 50/00* (2012.01)

(52) U.S. Cl.
CPC .......... *G06Q 10/10* (2013.01); *G06F 16/951* (2019.01); *G06F 16/9535* (2019.01); *G06Q 50/01* (2013.01)

(58) Field of Classification Search
CPC .. G06F 16/9535; G06F 16/9536; G06Q 50/01
See application file for complete search history.

(56) References Cited

U.S. PATENT DOCUMENTS

| | | | |
|---|---|---|---|
| 2003/0112357 A1 | 6/2003 | Anderson | |
| 2006/0143066 A1* | 6/2006 | Calabria | G06Q 50/01 705/7.29 |
| 2006/0143068 A1 | 6/2006 | Calabria | |
| 2008/0052634 A1 | 2/2008 | Fishkin et al. | |
| 2008/0065604 A1* | 3/2008 | Tiu | G06F 16/9535 |
| 2009/0031232 A1 | 1/2009 | Brezina et al. | |
| 2009/0248516 A1* | 10/2009 | Gross | G06Q 10/10 705/14.66 |
| 2009/0249451 A1 | 10/2009 | Su et al. | |
| 2009/0271524 A1* | 10/2009 | Davi | H04L 65/605 709/231 |
| 2010/0293029 A1 | 11/2010 | Olliphant | |
| 2011/0072107 A1 | 3/2011 | Gutta et al. | |

(Continued)

*Primary Examiner* — Grace Park
(74) *Attorney, Agent, or Firm* — James J. DeCarlo; Greenberg Traurig, LLP (57) ABSTRACT

A request is received, over a network from a requesting user to sort a plurality of comments relating to online content by a social status of a respective one of a plurality of commenters associated with each of the plurality of comments. The social status of the each of the plurality of commenters is determined using a computing device. The plurality of comments are sorted, using the computing device, by the social status of the respective one of the plurality of commenters associated with each of the plurality of comments. A representation of the sorted comments is transmitted, over the network, to the requesting user. The social status of commenters can reflect, in various embodiments, the status of commenters as favorite commenters of the requesting user, as members of the requesting user's social network, or as a top rated commenters in an online community.

19 Claims, 9 Drawing Sheets

(56) References Cited

U.S. PATENT DOCUMENTS

2011/0320423 A1\* 12/2011 Gemmell ............ G06F 16/9535
　　　　　　　　　　　　　　　　　　　707/706
2012/0059710 A1　　3/2012 Dutta
2012/0084667 A1\* 4/2012 Hickman ............... G06Q 50/01
　　　　　　　　　　　　　　　　　　　715/751
2012/0150997 A1\* 6/2012 McClements, IV ........................
　　　　　　　　　　　　　　　　　　　G06Q 10/101
　　　　　　　　　　　　　　　　　　　709/217

\* cited by examiner

SYSTEM AND METHOD FOR SOCIAL FILTERING OF COMMENTS

CROSS-REFERENCE TO RELATED APPLICATIONS

This application claims the benefit of and is a continuation of U.S. patent application Ser. No. 12/976,628, filed Dec. 22, 2010, titled "System and Method for Social Filtering of Comments", which is incorporated by reference herein in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for selecting and viewing comments relating to online content, and more particularly, to filtering comments using social data.

BACKGROUND OF THE INVENTION

Websites that provide online content commonly allow users to enter comments relating to such content. For example, news websites, such as Yahoo! News, which provide text articles, images and videos relating to current news stories, can allow registered users to enter comments relating to text articles, images and videos. Such commentaries may be of great interest to users. On websites such as Yahoo! News, however, popular news stories may receive thousands or tens of thousands of comments. Users may not be interested in the majority of such comments, but might prefer to focus on comments entered by favorite commenters or members of their social circle.

SUMMARY OF THE INVENTION

In one embodiment, the invention is a method and a computer readable storage media for tangibly storing thereon computer readable instructions for a method. A request is received, over a network, from a requesting user to sort a plurality of comments relating to online content by a social status of a respective one of a plurality of commenters associated with each of the plurality of comments. The social status of the each of the plurality of commenters is determined using a computing device. The plurality of comments are sorted, using the computing device, by the social status of the respective one of the plurality of commenters associated with each of the plurality of comments. A representation of the sorted comments is transmitted, over the network, to the requesting user.

In another embodiment, the invention is a computing device comprising a processor and a storage medium for tangibly storing thereon program logic for execution by the processor. The program logic comprises: receiving logic for receiving, over a network, a request from a requesting user to sort a plurality of comments relating to online content by a social status of a respective one of a plurality of commenters associated with each of the plurality of comments; determining logic for determining the social status of the each of the plurality of commenters; sorting logic for sorting the plurality of comments by the social status of the respective one of the plurality of commenters associated with each of the plurality of comments; and transmitting logic for transmitting, over the network, a representation of the sorted comments to the requesting user.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

The present invention is directed to systems and methods for ranking comments relating to online content using social data. Online content websites often provide means for entering, sorting and viewing comments relating to online content displayed on such websites. One set of examples are online news websites that allow users to comment on individual news stories. Typically, comments can be displayed using a variety of ranking options.

Figure 1:
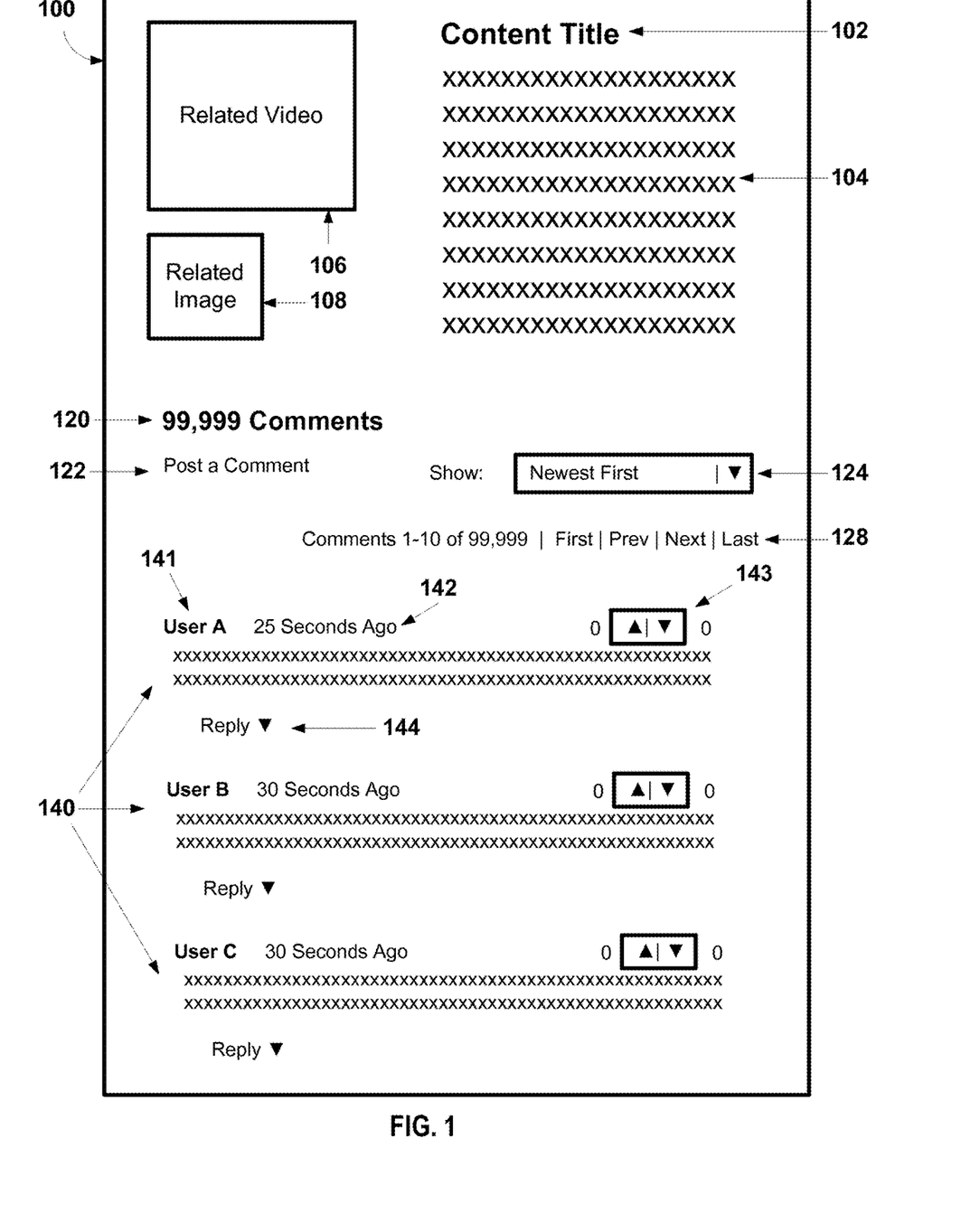
FIG. 1 illustrates an embodiment of a user interface for displaying online content including comments ordered by newest first.

FIG. 1 illustrates an embodiment of a user interface 100 for displaying online content including comments ordered by newest comments first. The user interface 100 displays various interface elements relating to online content, including a title 102, text 104, related videos 106 and related images 108. The interface elements relating to online content 102, 104, 106 and 108 could relate to any type of online content including, for example, news stories.

The user interface 100 additionally includes a comment section 120. The user interface 100 displays various interface elements relating to user comments on the online content displayed by the user interface. Such interface elements include a total number of comments 120, a link 122 that allows a user to enter a comment relating to the content, a comment sort order selection box 124 and a set of controls 128 to navigate through lists of comments 140. Each user comment 140 comprises a commenter name 141, a time the comment was posted 142, a control 143 that allows a user to vote up or down (e.g. like or dislike) on a comment and a link 144 that allows a user to enter a reply to a comment and/or view replies to a comment. In the illustrated embodiment, the comments 140 shown are so recent that no votes up or down 143 have been received, nor have any replies 144 been received.

Figure 2:
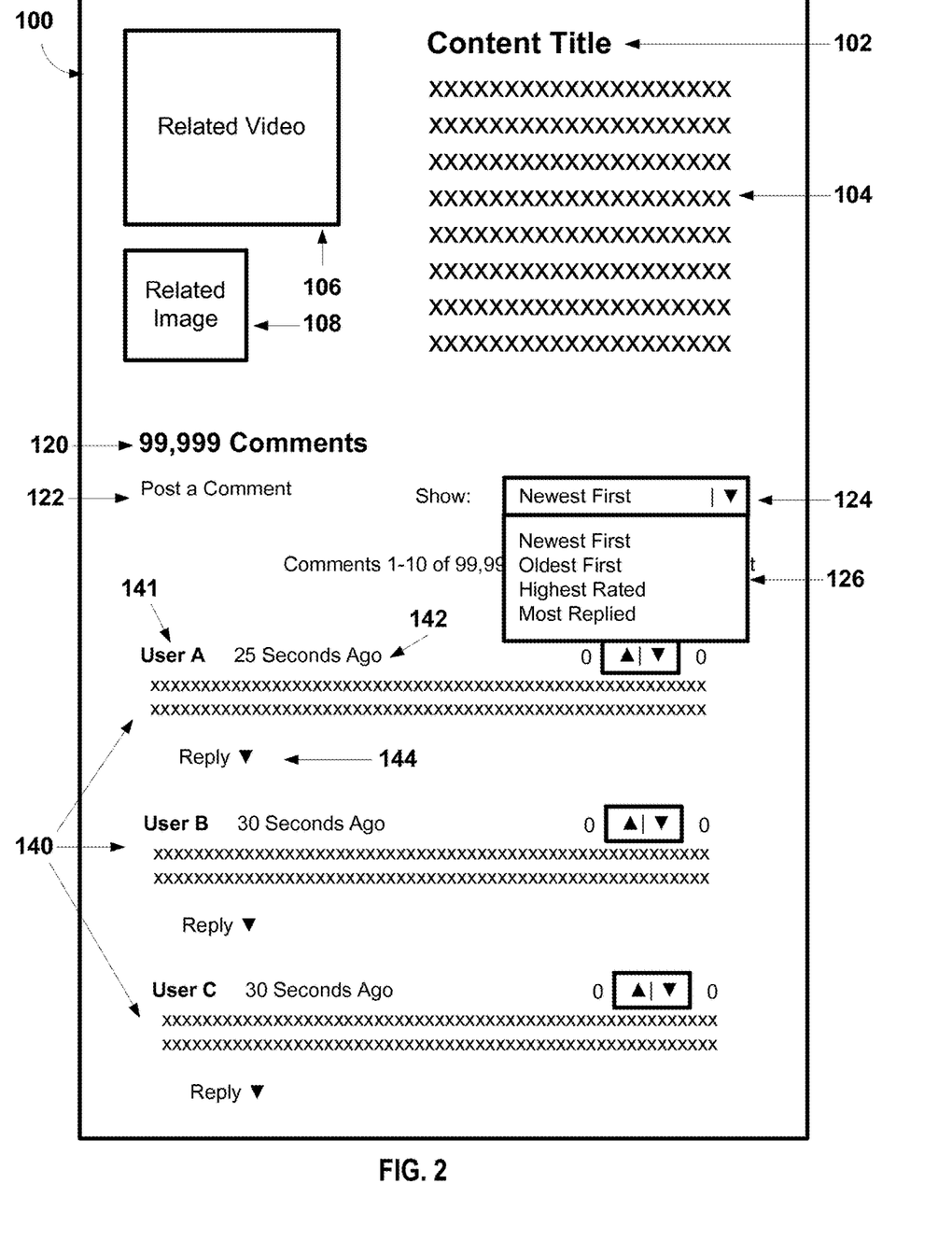
FIG. 2 illustrates an embodiment of the user interface illustrated in FIG. 1 where a dropdown menu is provided to order the comments by newest first, oldest first, highest rated and most replied.

FIG. 2 illustrates an embodiment of the user interface of FIG. 1 having a dropdown menu 126 for selecting various options for ranking comments. Such options include (1.) ranking newest comments first, (2) ranking oldest comments first, (3.) ranking highest rated comments first, and (4.) ranking comments receiving the most replies first.

Figure 3:
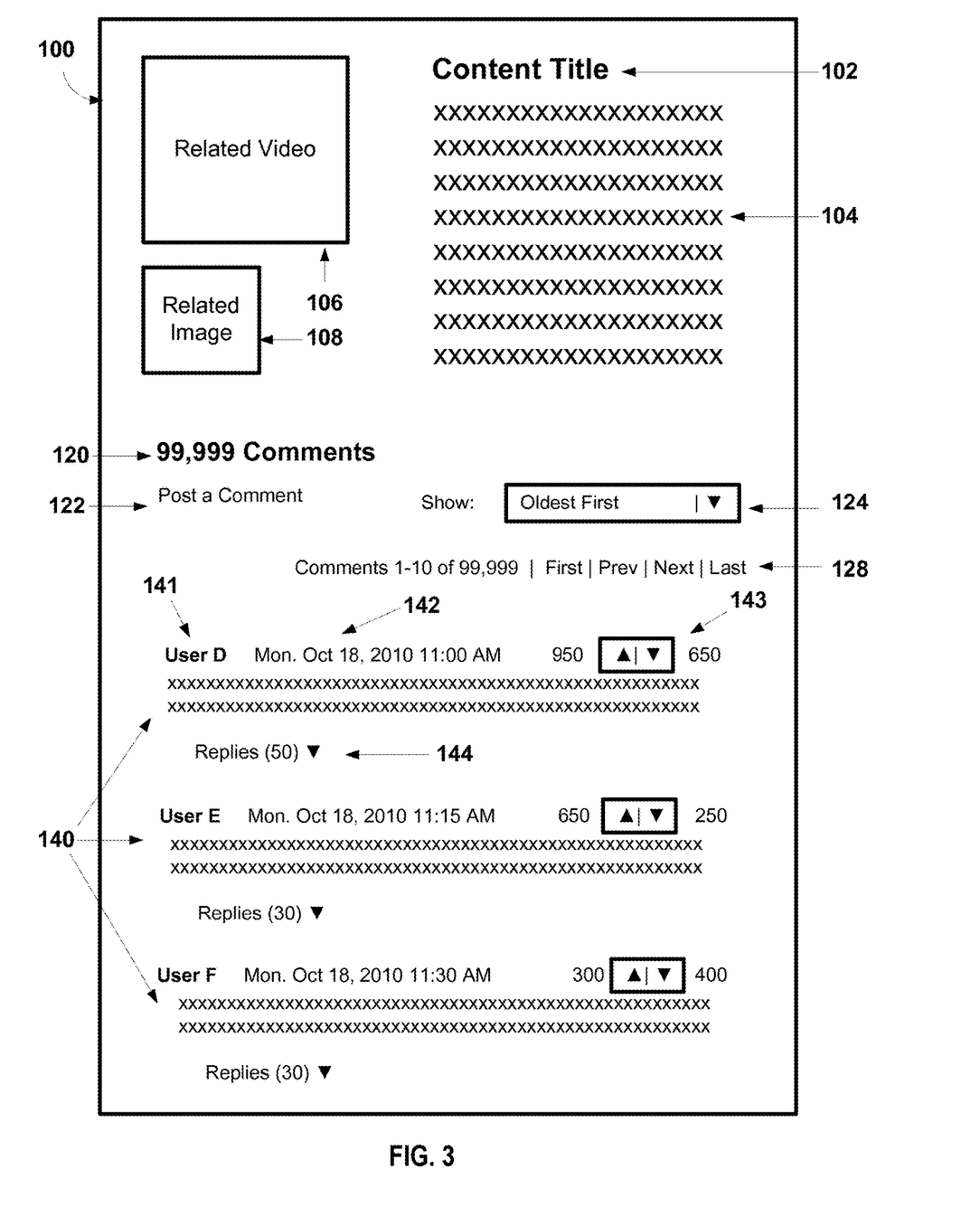
FIG. 3 illustrates an embodiment of a user interface for displaying online content including comments ordered by oldest first.

FIG. 3 illustrates an embodiment of the user interface of FIGS. 1 and 2 displaying online content including comments ordered by oldest comments first. The display is similar to that of FIGS. 1 and 2, but the top ranked comments 140 reflect a different set of users reflecting times 142 relatively distant in the past. In the illustrated embodiment, the comments 140 are old enough that all have received up and down votes 143 and replies 144.

In one embodiment, the present system and method provides enhanced personalization of the presentation of comments to users by providing one or more new sort orders for comments. One such sort order is one where a user's favorite commenters are ranked first. In one embodiment, a user's favorite commenters can include commenters a user has expressly flagged as a favorite commenter (e.g. via the online content website hosting the comment).

In one embodiment, a user's favorite commenters can include other users the user flagged as the user's friends or followers on social networking websites such as for example the FACEBOOK social networking website and/or microblogging websites such as for example the TWITTER social networking website. In one embodiment, a user's favorite commenters can include other users in any list of users that can be accessed in electronic form. Such a list could comprise, for example, the user's online address book, a LISTSERV list, an online directory or any other type of website where a list of users can be identified. In one embodiment, a user's favorite commenters include the user.

Figure 4:
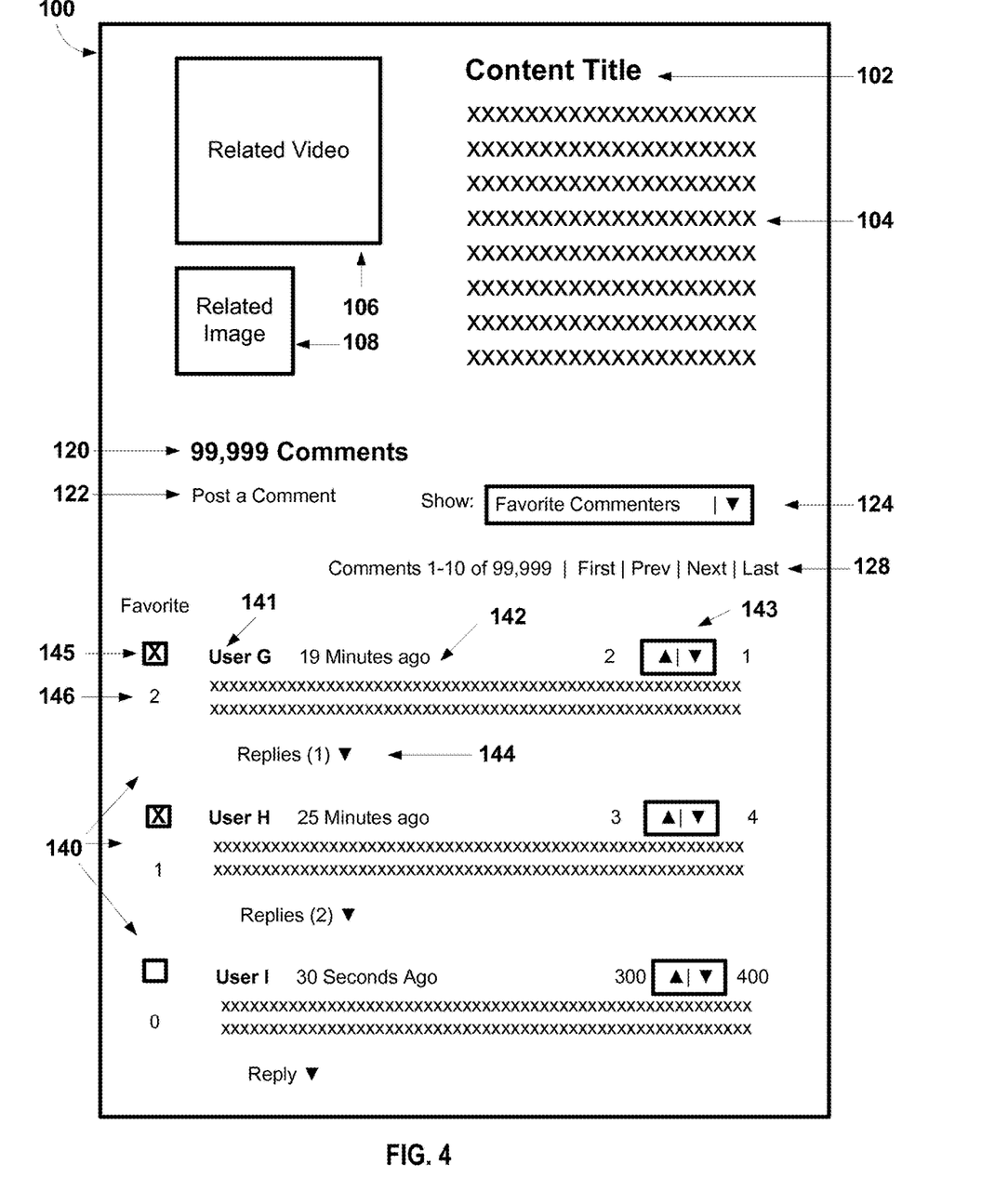
FIG. 4 illustrates an embodiment of a user interface for displaying online content including comments ordered by favorite commenters.

FIG. 4 illustrates an embodiment of a user interface for displaying online content including comments ordered by favorite commenters. The interface includes various elements 102-128 similar to those in the interfaces illustrated in FIG. 1-3. Each comment 140 additionally includes two elements, 145 and 146, relating to the status of individual commenters as favorite commenters and top commenters. In one embodiment, interface element 145 provides a check box a user can check and uncheck to indicate that a particular commenter is a favorite commenter. In one embodiment, if the commenter has previously been selected a favorite commenter with respect to this or any other comment or item of online content, the check box can be automatically checked.

In one embodiment, commenters are designated as favorites using the check box user interface element shown in FIG. 4. In one embodiment, commenters are additionally or alternatively designated as favorites by an automated process that automatically selects commenters that the user has designated as friends, followers or any other type of social contact on a social networking website. In one embodiment, commenters are additionally or alternatively designated as favorites by an automated process that automatically selects commenters identified in a list (e.g. an address book) or a website (e.g. of a club or social organization).

In one embodiment, commenters are ranked such that a user's favorite commenters are sorted above any commenters the user has not designated as favorite commenters. In one embodiment, within a group of comments provided by favorite commenters, the commenters can be sorted using additional ranking criteria, such as, for example, chronological ranking criteria (e.g. newest first or oldest first), highest rated first and most replied first. In one embodiment, within a group of comments not provided by favorite commenters, the commenters can be sorted using additional ranking criteria, such as, for example, newest first, oldest first, highest rated first and most replied first.

In one embodiment, interface element 146 displays a number that reflects a number of users that have flagged the user as a favorite commenter (e.g. via the favorite check box 145).

Figure 5:
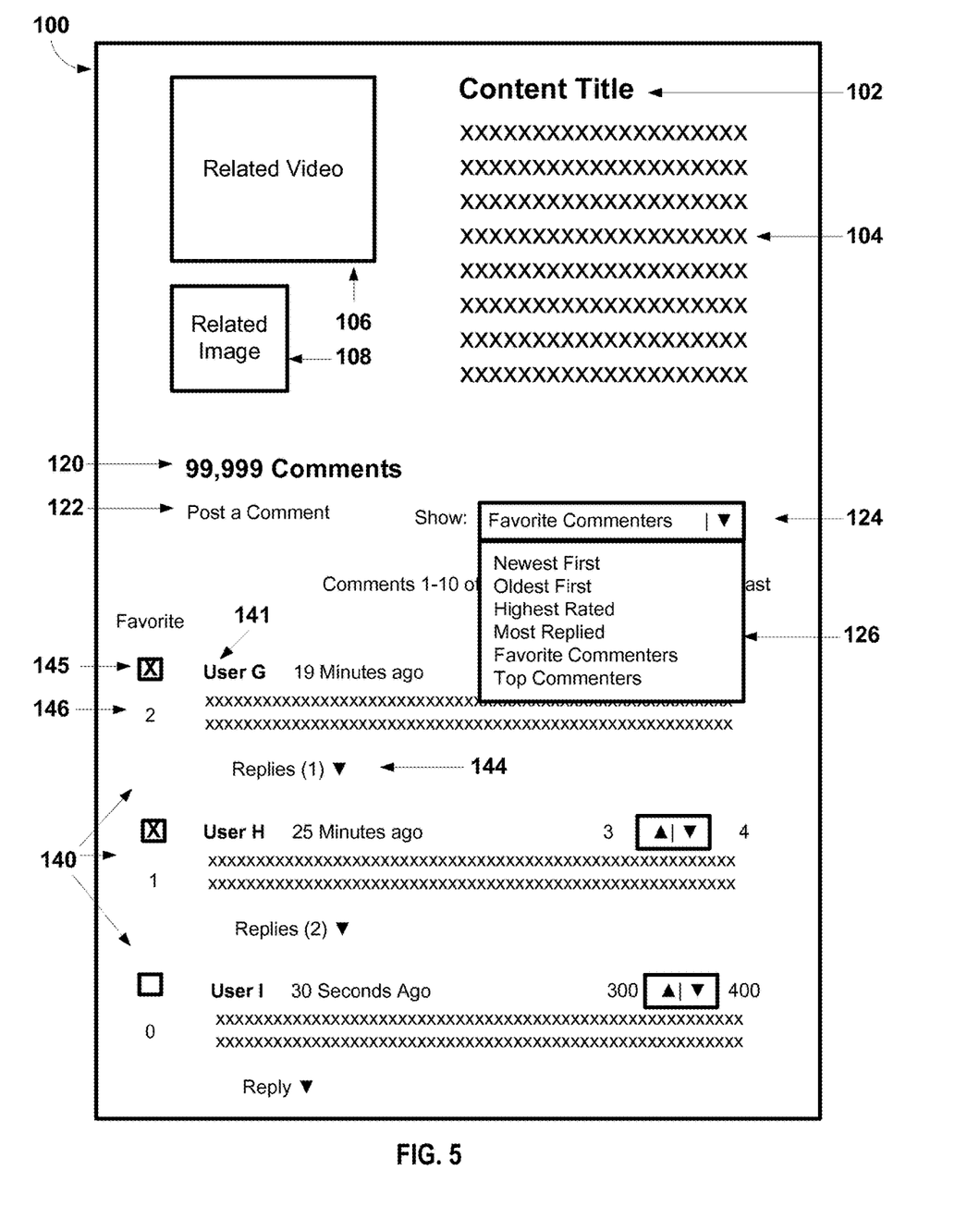
FIG. 5 illustrates an embodiment of the user interface illustrated in FIG. 4 where a dropdown menu is provided to order the comments by newest first, oldest first, highest rated and most replied, favorite commenters and top commenters.
Figure 6:
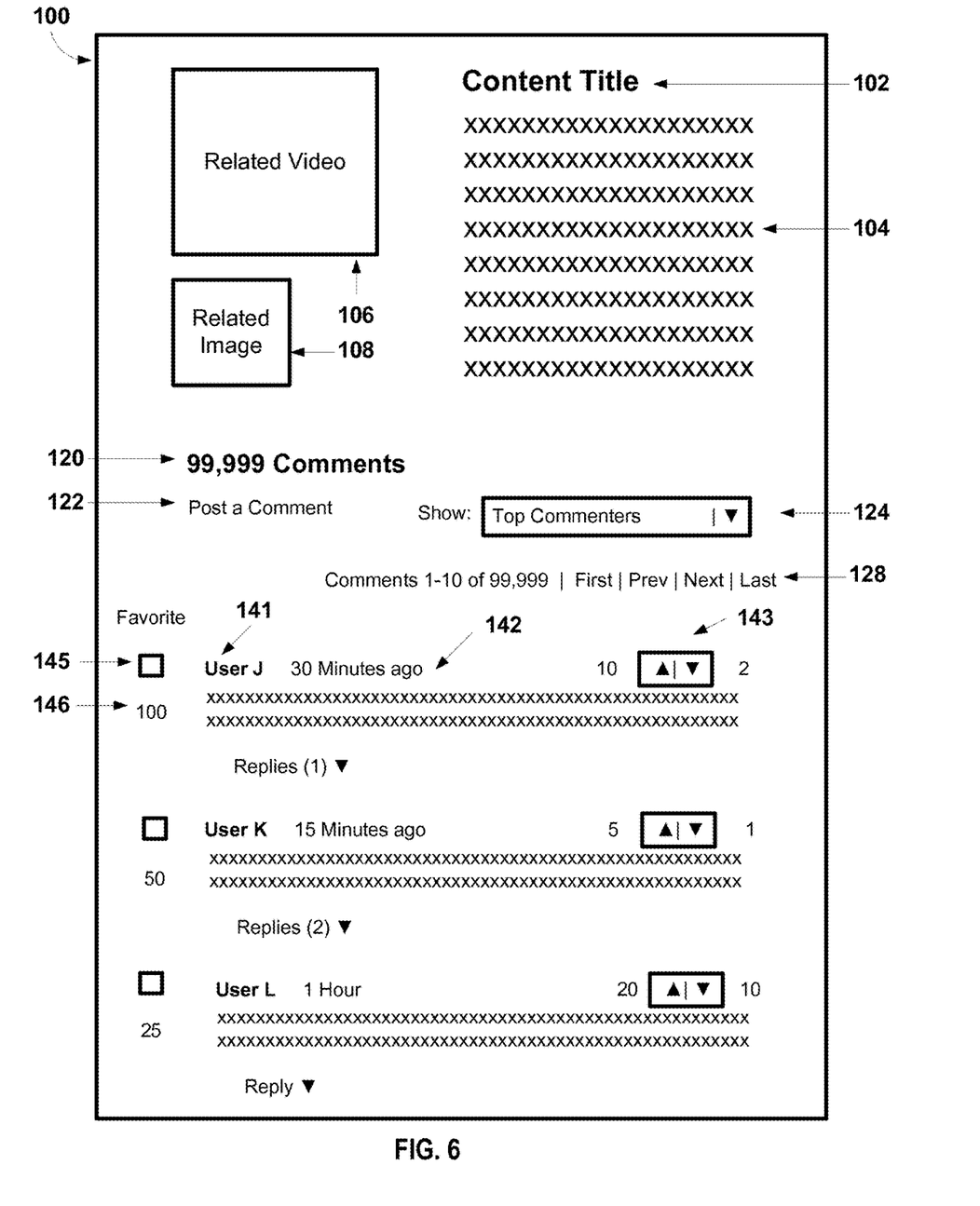
FIG. 6 illustrates an embodiment of a user interface for displaying online content including comments ordered by top commenters.

FIG. 5 illustrates an embodiment of the user interface of FIG. 1 having a dropdown menu 126 for selecting various options for ranking comments. Such options include (1.) ranking newest comments first, (2) ranking oldest comments first, (3.) ranking highest rated comments first, (4.) ranking comments receiving the most replies first, (5.) ranking favorite commenters first, and (6.) ranking top commenters first FIG. 6 illustrates an embodiment of the user interface of FIGS. 4 and 5 displaying online content including comments ordered by top commenters. The display is similar to that of FIGS. 4 and 5, but the top ranked comments 140 reflect a different set of users that the system has classified as top commenters. In one embodiment, top commenters are commenters that the largest number of users have designated as a favorite commentator. In FIG. 6, top commenters are ranked in order of the number of users that have designated as a favorite commentator.

In one embodiment, any of the sort orders shown in FIG. 1-6 could be a default sort order that is automatically selected when the page is displayed, and not in response to an explicit request.

The interfaces shown in FIG. 1-6 are purely illustrative, and are provided to illustrate various concepts embodied in the presently disclosed system and method. Those skilled in the art will appreciate that other user interface configurations could provide equivalent, or similar functions, and such embodiment are within the spirit and the scope of the presently disclosed system and method.

Figure 7:
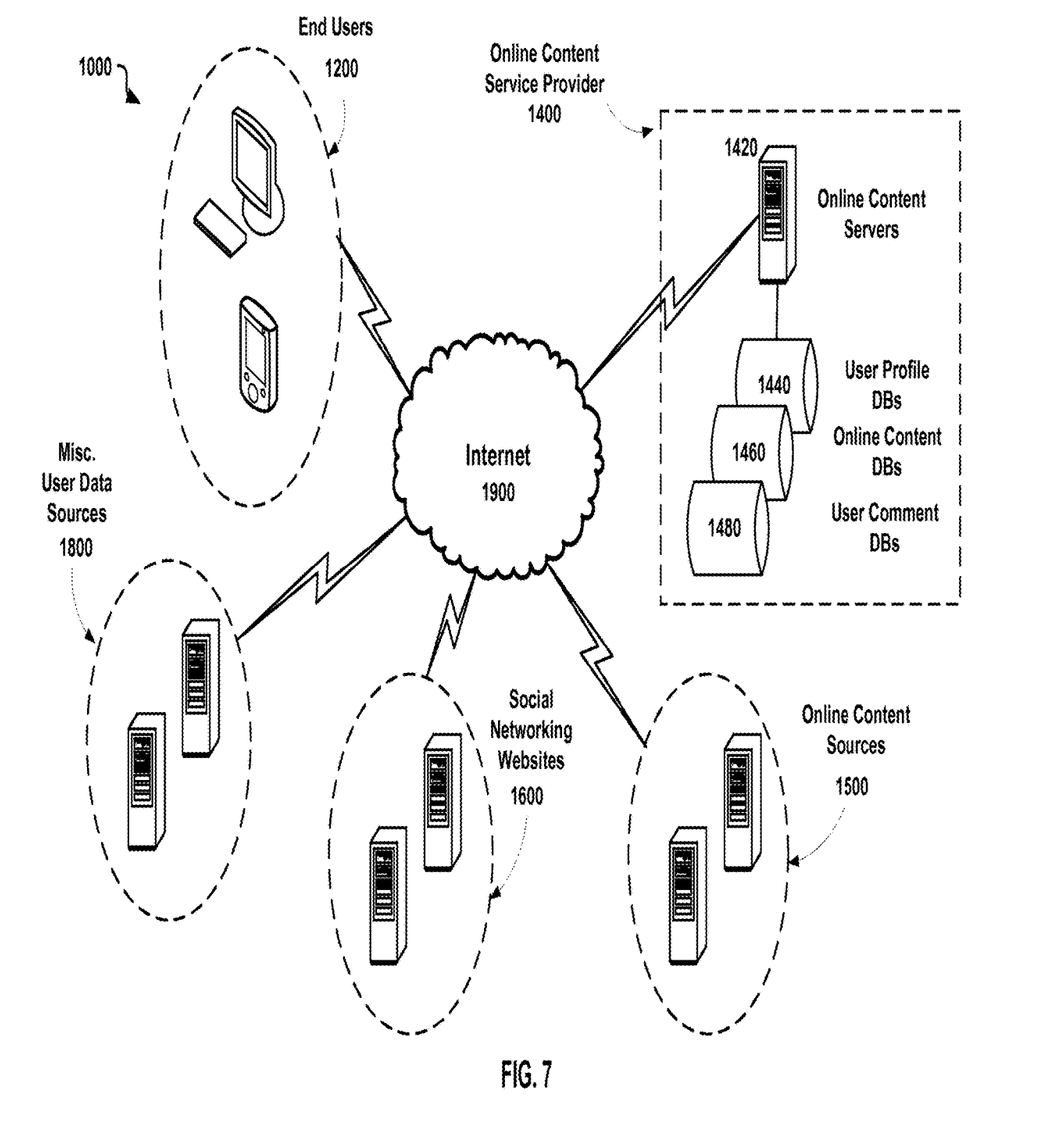
FIG. 7 illustrates a high-level view of a system 1000 capable of supporting various embodiments of the systems and methods described herein.

FIG. 7 illustrates a high-level view of one embodiment of a system 1000 capable of supporting various embodiments of the systems and methods described herein. End users 1200 access an online content service provided by an online content service provider 1400 over a network, such as, for example, the Internet 1900. The online content service can provide any type of online content of interest to end users 1200. Such online content could include, for example, news, topical articles, editorials, BLOGs and so forth.

Online content servers 1420 maintained by, or on behalf of the online service provider accumulate online content from various online content sources 1500 over the Internet 1900. Such online content sources 1500 could include, for example, news sources such as newswires, newspapers or news websites or broadcasts. Such online content sources 1500 could additionally or alternatively include any other online source of digital information, such as websites that aggregate articles, editorials, user websites and user BLOGs. Content could additionally be acquired from any other suitable source, such as, for example, batched files, hardcopy documents converted to digital format and/or manual entry (not shown).

In one embodiment, the online content servers 1420 store online content acquired over the Internet in one or more online content databases 1460. In one embodiment, the online content servers 1420 provide one or more user interfaces that allow end users 1200 to browse online content stored on the online content databases 1460, such as, for example, the interfaces shown in FIG. 1-6 above. In one embodiment, the online content servers 1420 provide one or more user interfaces that allow users to set up and maintain user profiles that store information relating to the users, such as, for example, user identity, user demographics, user preferences, user favorites and user social network information. In one embodiment, the online content servers 1420 user profile in one or more user profile databases 1440.

In one embodiment, the online content servers 1420 provide one or more user interfaces that allow users to enter and view comments relating to individual items of online content such as, for example, the interfaces shown in FIG. 1-6 above. In one embodiment, the online content servers 1420 store user comments in one or more user comment databases 1440. In one embodiment, such user interfaces allow users to sort comments by favorite commenters, and by top commenters such as shown, for example, in the interfaces shown in FIG. 4-6 above. In one embodiment, the user interfaces additionally allow users to designate individual commenters as favorite commenters. In one embodiment, when a user selects a specific commentator as a favorite commenter, such selection is stored in the user's profile in the user profile databases 1440.

In one embodiment, the online content servers 1420 can additionally retrieve information relating to users having profiles in the user profile databases 1440 from other online sources. In one embodiment, if a user's profile includes information relating to one or more social networking websites 1600 with which the user is registered, the online content servers 1420 can retrieve user social network information relating to the user from such websites. Such information could include one or more lists of other users with which the user has a designated relationship (e.g. friend, follower, business contact, etc.)

In one embodiment, if a user's profile includes information relating to one or more websites or other data sources 1800 having data relating to a user's contacts, the online content servers 1420 can retrieve such contact information from such sources. Such information could include, for example, a user address book, a file containing a list of users, such as a LISTSERV list, or a website of an organization to which the user belongs or has an interest in.

In one embodiment, the online content servers 1420 cross reference such lists of other users with user profiles on the user profile databases 1440. In one embodiment, where a social contact of a user is identified as a user having a profile on the online content service, such a social contact can be automatically designated as a favorite commenter of the user. In one embodiment, when a social contact is automatically selected as a favorite commenter of a user, such selection is stored in the user's profile in the user profile databases 1440. In one embodiment, the online content servers 1420 retrieve social contact data from social networking websites 1600 and other data sources 1800 on a periodic basis, for example, daily or weekly. In one embodiment, the online content servers 1420 retrieve social contact data from social networking websites 1600 and other data sources 1800 on a continuous basis, for example, via data feeds provided by such websites or data sources.

The system shown in FIG. 7 is purely illustrative. Those skilled in the art will appreciate that the functions provided by the system in FIG. 7 could be provided by a number of alternate configurations. For example, services provided by online content servers 1420 could be distributed across multiple servers controlled by more than one entity. For example, online content servers 1420 and databases 1440, 1460 and 1480 could represent virtual servers and cloud-based data storage provided by one or more cloud-based services entities. Alternatively or additionally, an online content service provider 1400 could also operate one or more online content sources 1500 or social networking websites using its servers 1420.

Figure 8:
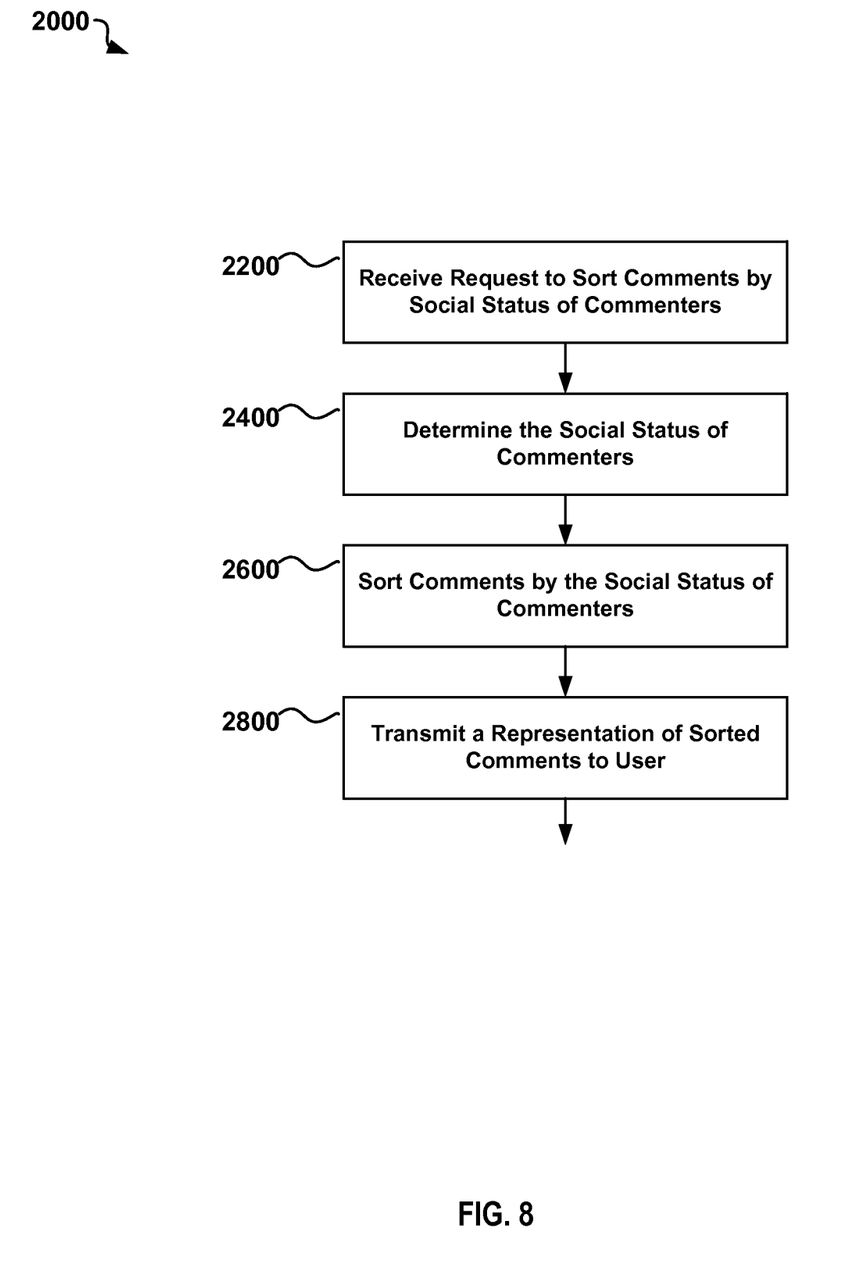
FIG. 8 illustrates a computer implemented process 2000 for social filtering of comments on an online content source website.

FIG. 8 illustrates a computer implemented process 2000 for social filtering of comments on an online content source website. Unless otherwise specified, it should be understood that the processing described with respect to each of the blocks of FIG. 8 is performed by at least one computing device maintained or controlled by an online content service. In one embodiment, such a computing device could be one or more of the online content servers of FIG. 7.

In block 2200, a request is received, over a network, from a requesting user, to sort a plurality of comments relating to online content by a social status of a respective one of a plurality of commenters associated with each of the plurality of comments. The online content may reflect any type of online content of interest to end users. Such online content could include, for example, news, topical articles, editorials, BLOGs and so forth.

In one embodiment, the online content and the comments relating to the online content are displayed to the requesting user via an interface similar or identical to the interface shown in FIG. 4-7. In one embodiment, the request to sort the plurality of comments is transmitted by the requesting user over the network when the user takes a user interface action on a user interface, for example, selecting a sort order from the drop down list 126 of FIG. 5. In one embodiment, the request to sort the plurality of comments is automatically issued by or on behalf of the user when a webpage is displayed using a default sort value. Such a default sort value could reflect, for example, a value embedded in the webpage, a cookie or a user profile.

In one embodiment, the social status reflects the status of each of the plurality of commenters having a relationship with the requesting user on one or more social networking websites. In one embodiment, the social status reflects the status of each of the plurality of commenters as a follower of the requesting user and/or as a user the requesting user is following on one or more microblogging websites. In one embodiment, the social status reflects the status of each of the plurality of commenters as a member of a defined group, such as, for example, users in an address book, a LISTSERV list, or a website for a club or organization.

In one embodiment, the social status reflects the status of each of the plurality of commenters as a favorite commenter of the requesting user. In one embodiment, favorite commenters are commenters the requesting user has expressly designated as favorite commenters, for example, via an online content system using the user interfaces shown in FIG. 4-6 (see, in particular, element 145. In one embodiment, favorite commenters can additionally or alternatively include commenters that are social contacts of the requesting user. In one embodiment, favorite commenters can additionally or alternatively include commenters that are members of a defined group. In one embodiment, favorite commenters can additionally or alternatively include the user.

In block 2400, the social status of the each of the plurality of commenters is then determined.

In one embodiment, where the social status reflects the status of each of the plurality of commenters as a social contact of the requesting user, a plurality of users defined as social contacts of the requesting user are identified on one or more websites. In one embodiment, such websites include any type of website where the requesting user can interact with other users of the website and designate such users as social contacts of the user.

Such websites could include social networking websites such as for example the FACEBOOK social networking website, where, for example, the requesting user can designate other users as having a relationship with the requesting user. For example, such relationships could include friend, relative, business contact and so forth. Such websites could, additionally or alternatively, include microblogging websites such as for example the TWITTER microblogging website, where, for example, social contacts of the requesting user can include followers of the requesting user and/or users the requesting user is following on such websites.

In one embodiment, the online content service accesses each of the websites having social contact information for the requesting user and extracts such information using facilities provided by such websites.

Such social contact information could include, for example, a list of users of one or more social networking website the requesting user has designated as having a relationship with the requesting user. Such social contact information could additionally reflect the degree of intimacy of the relationship between the requesting user and the requesting user's social contacts. For example, such degrees of intimacy could include, for example, friend, relative, business contact and so forth. In one embodiment, social contact information could be retrieved from one or more social networking websites reflecting contacts from an expanded social network, such as, for example, the requesting user's social contacts and social contacts of such contacts.

Such social contact information could include, additionally or alternatively, a list of users of one or more microblogging websites having a relationship with the requesting user on such websites. In one embodiment, such social contact information could include users the requesting user is following on a microblogging website. In one embodiment, such social contact information could additionally or alternatively include users following the requesting user on a microblogging website.

In one embodiment, the requesting user identifies websites having social contact information for the requesting user to the online content service and expressly authorizes the online content service to access and extract data relating to the requesting user on such websites. In one embodiment, such authorization comprises identifying the online content provider to such websites as authorized to access some or all of the requesting user's data. In one embodiment, such authorization comprises providing the requesting user's ID and password for such websites to the online content provider.

In one embodiment, the online content service accesses websites having social contact information for the requesting user and extracts such data using one or more public APIs provided by the websites. In one embodiment, the online content service accesses the social networking websites and extracts social contact data for the requesting user using an HTML based user interface provided by the social networking website to its users. For example, the online content service could log onto a social networking website using the requesting user's ID and password, display social contact data by emulating a user query on social contacts, and strip the contact information from the displayed query result.

In one embodiment, the social contact information is used to identify a subset of the plurality of commenters as a social contacts of the requesting user. In one embodiment, each of the subset of commenters is then assigned a social status reflecting the status of the respective commenter as a social contact of the requesting user. Note that the status of a commenter as a social contact of a user could comprise a simple, binary status, where a user is, or is not, a social contact of the user. Alternatively, the status of a commenter as a social contact of a user could reflect a series of values reflecting a degree of intimacy, for example, friend, relative, business contact, follower of, followed by and so forth.

In one embodiment, where the social status reflects the status of each of the plurality of commenters as a member of a defined group, a plurality of users that are members of a defined group are identified using an online data source, such as, for example, an address book, a LISTSERV list, or a website for a club or organization. In one embodiment, a subset of the plurality of commenters that are in the plurality of users that are members of the defined group are then identified. Each of the subset of commenters are assigned a social status reflecting the status of the respective commentator as a social contact of the requesting user.

In one embodiment, where the social status reflects the status of each of the plurality of commenters as a favorite commenter of the user, the status of commenters as a favorite of a user may be stored on a database, for example, a profile for the user on a user profile database. Favorite commenters of the user may alternatively or additionally include social contacts of the user, which can be determined, in one embodiment, as described above. Favorite commenters of the user may alternatively or additionally include members of a defined group, which can be determined, in one embodiment, as described above.

In one embodiment, the social status reflects the status of each of the plurality of commenters as a top commenter within an online community. In one embodiment, such an online community could reflect all users registered with an online content website. In one embodiment, such an online community could reflect all users registered within a users social network or expanded social network as defined on one or more websites such as social networking or microblogging websites.

In one embodiment, the status of each of the plurality of commenters as a top commenter reflects the number of users that have designated each of the respective commenters as a favorite commenter. In one embodiment, the status of each of the plurality of commenters as a top commenter reflects the number of users that have designated each of the respective commenters as a top commenter.

Note that various embodiments of the disclosed system and method could draw a distinction between favorite commenters and top commenters. For example, a user could designate a set of commenters as favorite commenters, but only designate a subset of such commenters as top commenters.

In block 2600, the plurality of comments are then sorted by the social status of the respective one of a plurality of commenters associated with each of the plurality of comments. In one embodiment, within groups of comments associated with commenters having the same social status, the comments could be sorted by additional criteria, such as, for example, chronologically (e.g. newest first or oldest first), highest rated first and most replied first.

Note that where social status comprises a range of values, the sort order of comments with reflect that range of values. For example, if the range of values reflect degrees of intimacy, the sort order can sort comments such that comments by the most intimate social contacts are ranked first.

In block 2800, a representation of the sorted comments are then transmitted, over the network, to the end user. In one embodiment, the transmission of the representation of the sorted comments to the user causes a computing device associated with the user to tangibly display the representation on a display device associated with the computing device.

Figure 9:
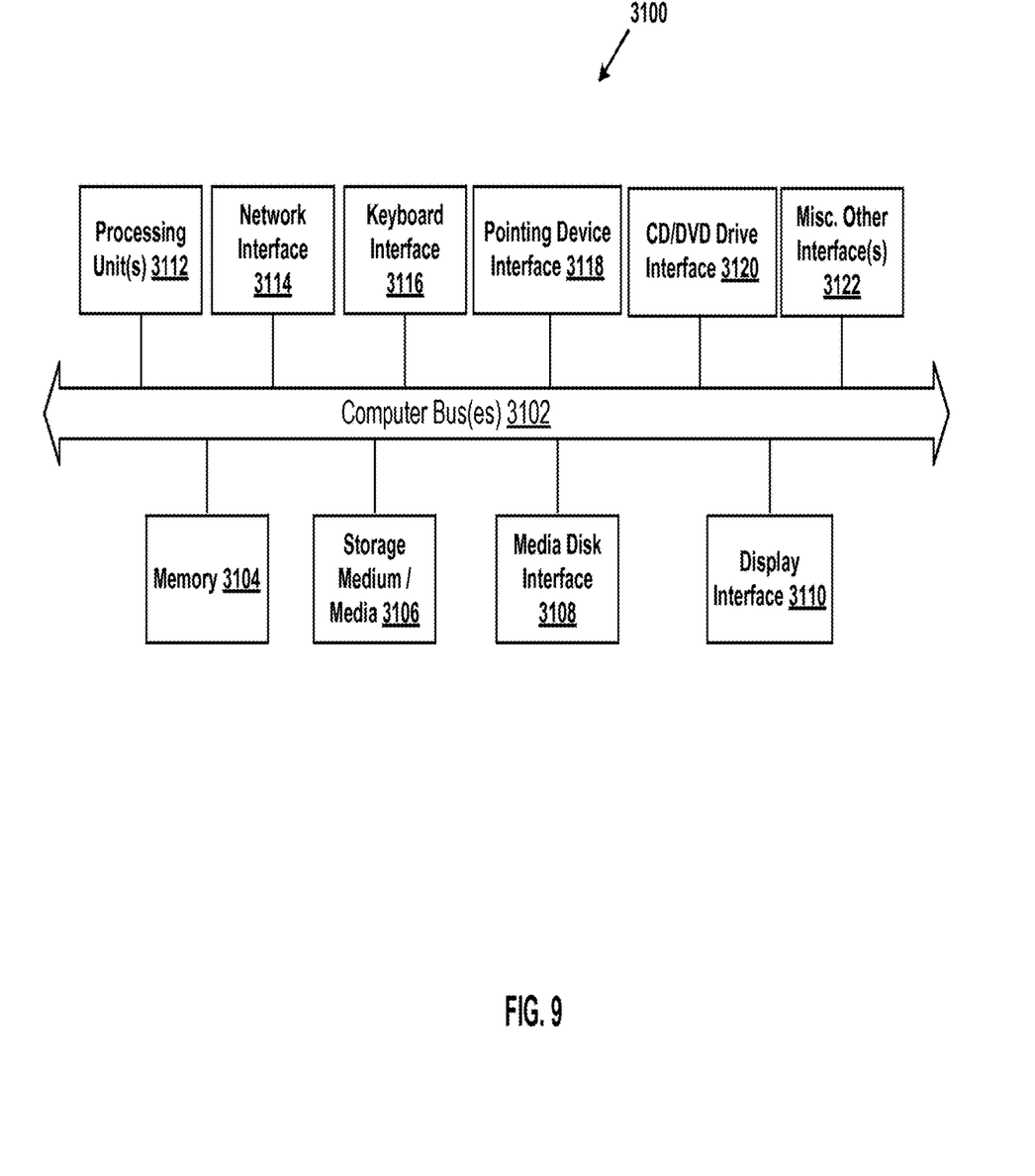
FIG. 9 is a block diagram illustrating an internal architecture of an example of a computing device.

FIG. 9 is a block diagram illustrating an internal architecture of an example of a computing device. In one embodiment, FIG. 9 could represent the internal architecture of the online content servers 1420 of FIG. 7. in accordance with one or more embodiments of the present disclosure. A computing device as referred to herein refers to any device with a processor capable of executing logic or coded instructions, and could be a server, personal computer, set top box, smart phone, pad computer or media device, to name a few such devices.

As shown in the example of FIG. 9, internal architecture 3100 includes one or more processing units (also referred to herein as CPUs) 3112, which interface with at least one computer bus 3102. Also interfacing with computer bus 3102 are persistent storage medium/media 3106, network interface 3114, memory 3104, e.g., random access memory (RAM), run-time transient memory, read only memory (ROM), etc., media disk drive interface 3108 as an interface for a drive that can read and/or write to media including removable media such as floppy, CD-ROM, DVD, etc. media, display interface 3110 as interface for a monitor or other display device, keyboard interface 3116 as interface for a keyboard, pointing device interface 3118 as an interface for a mouse or other pointing device, and miscellaneous other interfaces not shown individually, such as parallel and serial port interfaces, a universal serial bus (USB) interface, and the like.

Memory 3104 interfaces with computer bus 3102 so as to provide information stored in memory 3104 to CPU 3112 during execution of software programs such as an operating system, application programs, device drivers, and software modules that could comprise program code that, when executed by CPU 3112, perform the processing described with respect to the blocks of FIG. 8 above. CPU 3112 first loads computer-executable process steps from storage, e.g., memory 3104, storage medium/media 3106, removable media drive, and/or other storage device. CPU 3112 can then execute the stored process steps in order to execute the loaded computer-executable process steps. Stored data, e.g., data stored by a storage device, can be accessed by CPU 3112 during the execution of computer-executable process steps.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

I claim:

1. A method comprising:
   receiving, over a network, a request from a user to view an online content website, said website comprising content and a list of comments associated with a set of commenters;
   identifying, via a computing device, for each of the set of commenters, a type of social status with the user using social contact information obtained from a plurality of separate social networking sites, for each respective commenter of the set of commenters, the type of social status reflecting a degree of intimacy indicating a type of relationship with the user identified using the social contact information obtained from the plurality of separate social networking sites, at least one commenter of the set of commenters having a favorite type of social status with the user;
   filtering, via the computing device, said set of commenters to identify a subset of commenters based on said type of social status reflecting a degree of intimacy indicating a type of relationship with the user, the identified subset of commenters filtered based on said type of social status comprising each commenter from the set of commenters having a favorite type of social status with the user;
   modifying, via the computing device, said list of comments based on said identified subset of commenters; and
   communicating, over the network, said online content website, said communicated website comprising said content and said modified list of comments for presentation to the user.

2. The method of claim 1, further comprising:
   analyzing said set of commenters based on said social status information; and
   determining said subset of commenters based on said analysis, said subset comprising commenters that correspond to the set of users.

3. The method of claim 1, wherein said subset of commenters are users that have a type of social status within a user profile associated the user.

4. The method of claim 3, wherein said user profile comprises data from the plurality of separate social networking websites on the network.

5. The method of claim 1, wherein said filtering comprises:
   ranking, based on said type of social status of each commenter, said list of comments, wherein said modified list of comments is based on said ranking.

6. The method of claim 1, wherein said type of social status further comprises at least one of a social networking friend and a contact.

7. The method of claim 6, wherein said modified list of comments is ranked based on type of social status, comments of each commenter with a favorite type of social status being ranked above other types.

8. The method of claim 6, wherein said modified list of commenters is ranked based on type of social status, comments of each commenter with a contact type of social status being ranked at least above said social networking friend types.

9. The method of claim 1, wherein information indicating said type of social status is extracted and stored, wherein analysis on subsequent sites is based on said stored social status information.

10. A non-transitory computer-readable storage medium tangibly encoded with computer-executable instructions, such that when a computing device executes the instructions, a method is performed comprising:
    receiving, over a network, a request from a user to view an online content website, said website comprising content and a list of comments associated with a set of commenters;
    identifying, via the computing device, for each of the set of commenters, a type of social status with the user using social contact information obtained from a plurality of separate social networking sites, for each respective commenter of the set of commenters, the type of social status reflecting a degree of intimacy indicating a type of relationship with the user identified using the social contact information obtained from the plurality of separate social networking sites, at least one commenter of the set of commenters having a favorite type of social status with the user;
    filtering, via the computing device, said set of commenters to identify a subset of commenters based on said type of social status indicating a type of relationship with the user, the identified subset of commenters filtered based on said type of social status comprising each commenter from the set of commenters having a favorite type of social status with the user;
    modifying, via the computing device, said list of comments based on said identified subset of commenters; and
    communicating, over the network, said online content website, said communicated website comprising said content and said modified list of comments for presentation to the user.

11. The non-transitory computer-readable storage medium of claim 10, further comprising:
    analyzing said set of commenters based on said social status information; and
    determining said subset of commenters based on said analysis, said subset comprising commenters that correspond to the set of users.

12. The non-transitory computer-readable storage medium of claim 11, wherein said subset of commenters are users that have a type of social status within a user profile associated with the user.

13. The non-transitory computer-readable storage medium of claim 12, wherein said user profile comprises data from the plurality of separate social networking websites on the network.

14. The non-transitory computer-readable storage medium of claim 10, wherein said filtering comprises:

ranking, based on said type of social status of each commenter, said list of comments, wherein said modified list of comments is based on said ranking.

15. The non-transitory computer-readable storage medium of claim 10, wherein said type of social status further comprises at least one of a social networking friend and a contact.

16. The non-transitory computer-readable storage medium of claim 10, wherein information indicating said type of social status is extracted and stored, wherein analysis on subsequent sites is based on said stored social status information.

17. A computing device comprising:
- a processor; and
- a non-transitory computer-readable storage medium for tangibly storing thereon program logic for execution by the processor, the program logic comprising:
  - logic executed by the processor for receiving, over a network, a request from a user to view an online content website, said website comprising content and a list of comments associated with a set of commenters;
  - logic executed by the processor for identifying, via the computing device, for each of the set of commenters, a type of social status with the user using social contact information obtained from a plurality of separate social networking sites, for each respective commenter of the set of commenters, the type of social status reflecting a degree of intimacy indicating a type of relationship with the user identified using the social contact information obtained from the plurality of separate social networking sites, at least one commenter of the set of commenters having a favorite type of social status with the user;
  - logic executed by the processor for filtering, via the computing device, said set of commenters to identify a subset of commenters based on said type of social status indicating a type of relationship with the user, the identified subset of commenters filtered based on said type of social status comprising each commenter from the set of commenters having a favorite type of social status with the user;
  - logic executed by the processor for modifying, via the computing device, said list of comments based on said identified subset of commenters; and
  - logic executed by the processor for communicating, over the network, said online content website, said communicated website comprising said content and said modified list of comments for presentation to the user.

18. The computing device of claim 17, the program logic further comprising:
- logic executed by the processor for analyzing said set of commenters based on said social status information; and
- logic executed by the processor for determining said subset of commenters based on said analysis, said subset comprising commenters that correspond to the set of users.

19. The computing device of claim 17, wherein said filtering comprises:
- logic executed by the processor for ranking, based on said type of social status of each commenter, said list of comments, wherein said modified list of comments is based on said ranking.

* * * * *